United States Patent
Takata et al.

(10) Patent No.: US 7,282,109 B2
(45) Date of Patent: Oct. 16, 2007

(54) METHOD FOR PRODUCING LAMINATED POROUS POLYOLEFIN FILM AND LAMINATED POROUS POLYOLEFIN FILM

(75) Inventors: Atsuhiro Takata, Ichihara (JP); Ryuma Kuroda, Ichihara (JP); Takeshi Yamada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 75 days.

(21) Appl. No.: 10/791,383

(22) Filed: Mar. 3, 2004

(65) Prior Publication Data

US 2004/0258881 A1    Dec. 23, 2004

(30) Foreign Application Priority Data

Mar. 6, 2003    (JP)    ............................. 2003-059607

(51) Int. Cl.
*B32B 37/06*    (2006.01)
(52) U.S. Cl. ................. 156/229; 156/324; 156/244.11; 156/244.24
(58) Field of Classification Search .................. None
See application file for complete search history.

(56) References Cited

U.S. PATENT DOCUMENTS

| | | | |
|---|---|---|---|
| 4,472,328 A * | 9/1984 | Sugimoto et al. | ............. 264/41 |
| 6,811,643 B2 * | 11/2004 | McAmish et al. | .......... 156/229 |
| 6,884,839 B1 * | 4/2005 | Bendix et al. | ............. 524/570 |
| 2002/0156167 A1 | 10/2002 | Takata et al. | |
| 2003/0105446 A1 * | 6/2003 | Hutson et al. | ......... 604/385.22 |

FOREIGN PATENT DOCUMENTS

| EP | 0823740 A1 | 2/1998 |
|---|---|---|
| JP | 61-273941 A | 12/1986 |
| JP | 02036938 A | 2/1990 |
| JP | 06-55629 A | 3/1994 |
| JP | 06-182918 A | 7/1994 |
| JP | 06205616 A | 7/1994 |
| JP | 07256809 A | 10/1995 |
| JP | 07-304110 A | 11/1995 |
| JP | 08-138644 A | 5/1996 |
| JP | 09-250097 A | 9/1996 |
| JP | 10-330520 A | 12/1998 |

* cited by examiner

*Primary Examiner*—Jessica Ward
(74) *Attorney, Agent, or Firm*—Sugrue Mion, PLLC

(57) ABSTRACT

Disclosed is a method for producing a laminated porous polyolefin film, the method comprising steps of:
  providing a pair of tools for thermocompression bonding two resin films therebetween,
  laminating two films each comprising at least one layer made of a polyolefin resin composition comprising 100 parts by weight of a polyolefin resin having a melt index of 0.1 g/10 min or less and 80 to 300 parts by weight of a filler to form a laminated film by piling and thermocompression bonding the films between the thermocompressing portions of the tools, wherein the surface temperature of each thermocompressing portion is adjusted to a temperature higher than the melting point of the polyolefin resin by from 5 to 25° C. during the lamination, and
  drawing the laminated film to form micropores therein, thereby yielding a porous film.

2 Claims, 1 Drawing Sheet

METHOD FOR PRODUCING LAMINATED POROUS POLYOLEFIN FILM AND LAMINATED POROUS POLYOLEFIN FILM

BACKGROUND OF THE INVENTION

1. Field of the Invention

The present invention relates to a method for producing a laminated porous polyolefin film which is superior in mechanical strength, air permeability and interlayer adhesiveness and which is free of pinholes.

2. Description of the Related Art

Porous films made of polyolefin resin have been employed in various fields such as clothes, filters and cell separators. Especially, porous films made of resin having a high strength, namely, resin having a low MI, are employed because a high mechanical strength is generally required in the use of porous films as cell separators. A development of porous films meeting the demand for further improvement in performance such as strength and ion permeability with recent increase in cell capacity is going on.

As a method for producing a laminated porous film made of a common polyolefin resin, for example, a method comprising drawing a multilayer extrusion formed laminated film to form a porous film is disclosed in Japanese Patent Laid-Open No. 62-79806. However, this method has a problem that occurrence of foreign substance contamination or fish eyes during the formation of a laminated film will result in appearance of pinholes penetrating the film through the processing of the laminated film into a porous film. On the other hand, polyolefin resin which can be molded by multilayer extrusion generally has an MI of about 2 to 100. Laminated porous films made of such polyolefin resin problematically have poor strength.

In light of such situations, as one example of a method for obtaining a laminated porous film made of a low-MI resin, namely, an ultra high molecular weight resin, a method comprising thermally bonding a single layer porous film made of an ultra high molecular weight polyethylene and a porous film resulting from a 1.3-fold drawing of the foregoing porous is disclosed in Japanese Patent Laid-Open No. 6-182918.

However, this method has a problem that favorable air permeability and favorable interlayer adhesiveness cannot be achieved simultaneously because porous films are laminated together. In other words, lamination conducted at a low temperature such that pores are not closed will result problematically in an insufficient adhesion strength which will cause delamination of layers. On the other hand, lamination conducted at a high temperature so that a sufficient adhesion strength is achieved will problematically cause pores to close, resulting in an insufficient air permeability.

SUMMARY OF THE INVENTION

In light of the problems with the above-mentioned prior art, the object of the present invention is to provide a method for producing a laminated porous polyolefin film which is superior in mechanical strength, air permeability and interlayer adhesiveness and which is free of pinholes.

The present invention provides a method for producing a laminated porous polyolefin film comprising lamination of two films made of a polyolefin resin composition comprising 100 parts by weight of a polyolefin resin having a melt index (MI) of 0.1 g/10 min or less and 80 to 300 parts by weight of a filler together by thermocompression bonding using a pair of tools, and subsequent drawing, wherein the surface temperature of each tool is adjusted to be higher than the melting point of the polyolefin resin by from 5 to 25° C. In particular, the invention provides a method for producing a laminated porous polyolefin film, the method comprising steps of:

providing a pair of tools for thermocompression bonding two resin films therebetween, each of the tools having a thermocompressing portion between which and the thermocompressing portion of the other tool two films are piled and compressed to bond together, laminating two films each comprising at least one layer made of a polyolefin resin composition comprising 100 parts by weight of a polyolefin resin having a melt index of 0.1 g/10 min or less and 80 to 300 parts by weight of a filler to form a laminated film by thermocompression bonding the films between the thermocompressing portions of the tools, wherein the surface temperature of each thermocompressing portion is adjusted to a temperature higher than the melting point of the polyolefin resin by from 5 to 25° C. during the lamination, and drawing the laminated film to form micropores therein, thereby yielding a porous film. Moreover, the present invention also provides a laminated porous polyolefin film obtained by the foregoing method.

Figure 1:
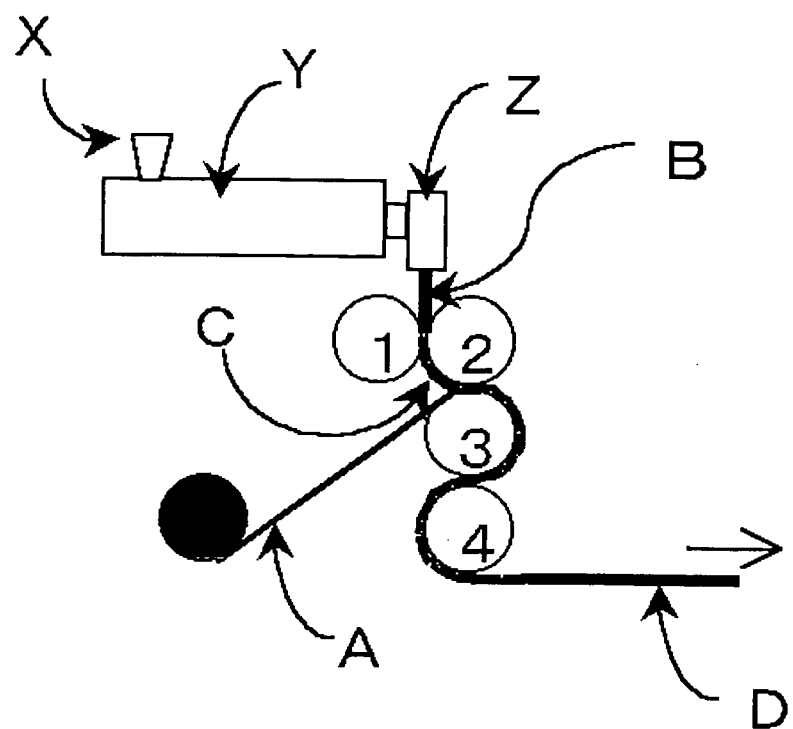
FIG. 1 is a drawing which illustrates one example of the method for producing a laminated polyolefin film.

In the drawings, each of the reference letters and numerals has a meaning given below:

A: polyolefin film; B: polyolefin resin composition; C: polyolefin film; D: laminated polyolefin film; E: polyolefin film; F: polyolefin film; G: laminated polyolefin film; X: hopper; Y: extruder; Z: T die; 1: roll; 2, 3: rolls having a surface temperature adjusted to be higher than the melting point of polyolefin resin by from 5 to 25° C.; 4: roll; 5, 6: rolls having a surface temperature adjusted to be higher than the melting point of polyolefin resin by from 5 to 25° C.; 7: roll.

DESCRIPTION OF PREFERRED EMBODIMENTS

The type of the polyolefin resin for use in the present invention is not particularly restricted. Examples thereof include polyethylene resin such as low-density polyethylene, linear polyethylene (ethylene-α-olefin copolymer) and high-density polyethylene, polypropylene resin such as homopolypropylene and ethylene-propylene copolymer, poly(4-methylpentene-1), poly(butene-1) and ethylene-vinyl acetate copolymer.

A single polyolefin resin may be used. Alternatively, two or more polyolefin resins may be used together.

The polyolefin resin for use in the present invention is a resin having a melt index (henceforth, referred to as MI) of 0.1 g/10 min or less. Polyolefin films obtained by use of such polyolefin resins are superior in mechanical strength such as needle penetration strength. Therefore, laminated porous polyolefin films obtained by laminating those polyolefin films and forming micropores therein are also superior in mechanical strength.

In the method of the present invention, because the film which is subjected to lamination by thermocompression bonding contains a polyolefin resin having a high melt viscosity indicated by an MI of 0.1 g/10 min or less, the surface of the film is not roughened even if it is heated with a tool for thermocompression bonding having a surface temperature adjusted to be higher than the melting point of the polyolefin resin by from 5 to 25° C. Moreover, a high interlayer adhesiveness can be achieved because the thermocompression bonding is carried out at a temperature higher than the melting point of the polyolefin resin by from 5 to 25° C.

The MI used in the present invention is measured according to JIS K 7210 and means the weight of the resin which is discharged through an orifice having a predetermined shape per 10 minutes at a temperature of 200° C. under a load of 2.16 kg. MI is expressed in g/10 min.

When two or more kinds of polyolefin resins are employed, the MI value of the polyolefin resin composition obtained by melt-kneading the resins in the ratio of them to be used must be 0.1 g/10 min or less.

The polyolefin resin in the present invention is preferably a polyolefin resin containing 10% by weight or more, more preferably 20% by weight or more, of a polyolefin having a molecular chain length of 2850 nm or longer. Laminated porous polyolefin films produced by use of such polyolefin resins are films extremely superior in mechanical strength.

The molecular chain length of a polyolefin resin used herein is a molecular chain length calculated based on a polystyrene calibration standard by GPC (gel permeation chromatography) and concretely is a value determined in the procedure described below.

The mobile phase used in GPC is a solvent in which both the polyolefin resin to be measured and polystyrene standards of known molecular weights can be dissolved. Orthodichlorobenzene is usually employed. The measuring temperature may be any temperature at which the resin to be measured is dissolved in a solvent. However, the measurement is normally carried out at 140° C.

First, a plurality of polystyrene standards having different molecular weights are measured by GPC to determine the retention time of each polystyrene standard. Using factor Q of polystyrene, the molecular chain length of each polystyrene standard is determined, whereby the molecular chain length of each polystyrene standard and its corresponding retention time come to be known. The molecular weight, molecular chain length, and factor Q of each polystyrene standard are in the following relationship:

Molecular weight=Molecular chain length×Factor $Q$

Then, a polyolefin resin to be measured for its molecular chain length is subjected to GPC measurement, thereby giving a curve of (retention time) vs. (amount of component eluted). When the molecular chain length of a polystyrene standard whose retention time is T in GPC measurement of polystyrene standards is defined as L, an eluted component exhibiting a retention time of T in GPC measurement of a polyolefin resin is considered to have a molecular chain length of L based on polystyrene standards. Using this relation, it is possible to convert a curve of (retention time) vs. (amount of component eluted) for polyolefin resin into a curve of (molecular chain length based on polystyrene standards) vs. (amount of component eluted) for the polyolefin resin. This clarifies the molecular chain length distribution of the polyolefin resin based on polystyrene standards.

In the present invention, the amount of polyolefin having a molecular chain length of 2850 nm or more can be obtained as the ratio of an integral over a range corresponding to molecular chain lengths of 2850 nm or more to an integral over the whole range of the curve of (molecular chain length) vs. (amount of component eluted) determined by the above-described method.

The polyolefin resin composition in the present invention contains 80 to 300 parts by weight of filler based on 100 parts by weight of polyolefin resin.

If the content of the filler is less than 80 parts by weight, the air permeability of laminated porous polyolefin films after drawing will be insufficient. On the other hand, when the content is more than 300 parts by weight, the resulting laminated porous polyolefin films will be superior in air permeability, but the films will be poor in needle penetration strength.

As the filler, inorganic fillers and organic fillers conventionally used are available. Either a single filler or two or more fillers may be used. An inorganic filler and an organic filler may be used in combination.

Examples of usable inorganic fillers include calcium carbonate, talc, clay, kaolin, silica, hydrotalcite, silicic acid, magnesium carbonate, barium carbonate, calcium sulfate, magnesium sulfate, barium sulfate, aluminium hydroxide, magnesium hydroxide, calcium oxide, magnesium oxide, titanium oxide, alumina, mica, zeolite, glass powder and zinc oxide and the like.

As the organic filler, various kinds of resin particles can be employed. Examples thereof include particles of a single kind of or two or more kinds of monomers selected from styrene, vinyl ketone, acrylonitrile, methyl methacrylate, ethyl methacrylate, glycidyl methacrylate, glycidyl acrylate, methyl acrylate and the like, and polycondensation resins of melamine, urea and the like.

In the case of removing filler from a drawn laminated porous polyolefin film, it is preferable to use calcium carbonate or silicic acid as the filler.

The polyolefin resin composition may contain other additives such as surfactants, stabilizers, antioxidants, ultraviolet absorbers and flame retardants.

The present invention is directed to a method for producing a laminated porous polyolefin film, the method comprising laminating, by thermocompression bonding, two films each made of a polyolefin resin composition comprising a polyolefin resin and a filler as those mentioned above, and then drawing the resulting laminated film.

Here, the films to be subjected to the lamination by thermocompression bonding in the method of the present invention, which hereinafter are sometimes referred to as "films for lamination," will be explained below.

The polyolefin resin composition which constitutes the film for lamination can be produced by kneading a polyolefin resin such as that mentioned above and a filler in a normal kneading machine. Examples of kneading machines to be used include extruders and roll type or Banbury type kneading machines.

The method of the present invention includes not only an embodiment where two single layer films each made of a polyolefin resin composition are laminated but also an embodiment where a single layer film and a multilayer film made up of two or more single layer films are laminated and an embodiment where two multilayer films are laminated.

First, the method for preparing a single layer film made of a polyolefin resin composition is described. A single layer films can be produced by use of a polyolefin resin composition described above using a known method for processing a low-MI polyolefin resin into a film. Examples of the method for producing a single layer film include methods using rolls for rolling or calender rolls and the scaife method (cutting). Preferred is a method using a rolling machine equipped with a pair of rolls for rolling which rotate at almost the same circumferential speed. This method can produce a single layer film having a smooth and beautiful surface and being superior in film thickness accuracy.

In one embodiment of the present invention, a single layer film made of a polyolefin resin composition and a multilayer film made up of two or more layers each made of a polyolefin resin composition are laminated. The multilayer film used in this case can be prepared by utilizing a lamination technique by thermocompression bonding used in the method of the present invention.

In another embodiment of the present invention, two multilayer films made up of two or more layers each made of a polyolefin resin composition. The multilayer films used in this case are also prepared by utilizing a lamination technique by thermocompression bonding used in the method of the present invention.

In the method of the present invention, films for lamination formed by extrusion forming or the like may be introduced directly to the lamination step without being wound. In another available embodiment, a film for lamination may be wound up into a roll and then introduced to the lamination step while being released from the roll. For example, introducing an extrusion formed film to the lamination step while the film is still hot is one preferred embodiment.

In the method of the present invention, two films for lamination are thermocompression bonded together first by a pair of tools to yield a laminated film.

Each of the paired tools used in the preparation of the laminated film has a thermocompressing portion between which and the thermocompressing portion of the other tool two films are piled and compressed to bond together. Examples of apparatus equipped with such paired tools include rolling machines, continuous press machines and calender roll machines. Preferred is use of a rolling machine by which a material can be rolled between a pair of rolls rotating at almost the same circumferential speed. The use of such a rolling machine will make it easy to produce a laminated film having a smooth and beautiful surface and a uniform film thickness. When films for lamination are laminated through a rolling machine, the circumferential speeds of the two rolls in this machine are not required to be accurately the same. A difference in circumferential speed between the two rolls within about ±5% is acceptable. The rolling machine may have two or more rolling sites. In other words, the rolling machine may have two or more pairs of thermocompressing portions.

When films for lamination are laminated, the surface temperatures of the thermocompressing portions of the paired tools are adjusted at temperatures higher than the melting point of the polyolefin resin by from 5 to 25° C. If the surface temperature of the thermocompressing portion of a tool is adjusted to be lower than a temperature which is higher than the melting point of the polyolefin resin by 5° C., the adhesiveness between the films laminated will be poor to cause delamination. If it is adjusted to be higher than a temperature which is higher than the melting point of the polyolefin resin by 25° C., a defect, if any, such as a contamination of foreign substances, in one layer will be transmitted to the other layer during the lamination, which will result in the formation of pinholes penetrating the laminated film along its thickness during the following drawing step. The method for adjusting the surface temperatures of the tools is not particularly restricted. Examples thereof include adjusting by using heaters built in the tools, adjusting by passing a heating medium such as hot water and steam into the tools, and adjusting by heating the tools from the outside thereof.

The melting point of the polyolefin resin in the present invention means the peak temperature obtained by DSC (differential scanning calorimetry). Moreover, when two or more peaks are found, for example, when the polyolefin resin is composed of two or more components, the highest peak temperature is used as the melting point of the polyolefin resin. The DSC measurement is carried out at a temperature increase rate of 5° C./min.

When the polyolefin resin composition forming the jointing surface of one film for lamination is different from that forming the jointing surface of the other film, the melting point of a polyolefin resin which is used as the standard for determination of the surface temperature of the thermocompressing portions is the melting point of the polyolefin resin having the highest melting point of the polyolefin resins in the polyolefin resin compositions.

Figure 2:
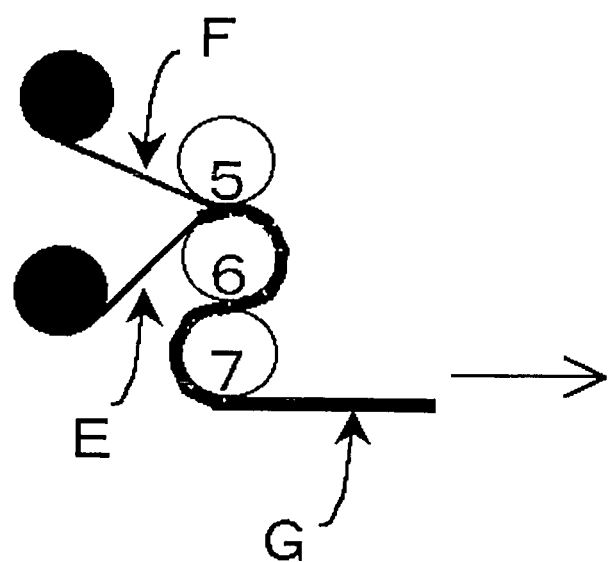
FIG. 2 is a drawing which illustrates one example of the method for producing a laminated polyolefin film.

An example in which films for lamination are laminated by use of rolls for rolling is explained concretely with reference to FIGS. 1 and 2.

FIG. 1 is a schematic view showing the method for laminating, between rolls for rolling, a film for lamination prepared in advance and a film for lamination immediately after being extruded.

First, a film (A) for lamination made of a polyolefin resin containing 100 parts by weight of a polyolefin resin having an MI of 0.1 g/10 min or less and 80 parts by weight of a filler is prepared in advance.

Then, 100 parts by weight of polyolefin resin and 80 parts by weight of filler are charged through a hopper (X) and melt-kneaded in an extruder (Y) to yield a polyolefin resin composition (B), which is extruded into a sheet form through a T-die (Z) and rolled between rolls (1) and (2). While a single layer film (C) for lamination made of the polyolefin resin composition (B), the film (A) is inserted between rolls (2) and (3) to be thermocompression bonded with the polyolefin film (C) to yield a laminated film (D). During the above process, the surface temperatures of the rolls (2) and (3) are adjusted to be higher than the melting point of the polyolefin resin by from 5 to 25° C. It is preferable that the surface temperature of the roll (1) be also adjusted to be higher than the melting point of the polyolefin resin by from 5 to 25° C. It is more preferable that the surface temperatures of rolls (1), (2) and (3) be the same temperature because temperature controlling can be achieved easily.

FIG. 2 is a schematic view illustrating the method in which polyolefin films (E) and (F) prepared in advance are laminated between rolls for rolling. First, the polyolefin films (E) and (F) made of a polyolefin resin composition containing 100 parts by weight of a polyolefin resin having an MI of 0.1 g/10 min and 80 parts by weight of a filler are prepared in advance.

The polyolefin films (E) and (F) are inserted between rolls (5) and (6), whose surface temperatures are adjusted to be higher than the melting point of the polyolefin resin by from 5 to 25° C., to be thermocompression bonded together to form a laminated polyolefin film (G).

Next, the resulting laminated polyolefin film is drawn to form a porous film. The method for drawing may be a known method. Examples thereof include drawing by use of a tenter, rolls or the like.

The drawing is preferably carried out so as to achieve a draw ratio of 2 to 10 times, more preferably 4 to 6 times. If the draw ratio is too low, the air permeability tends to be worse. On the other hand, if too high, coarse pores tend to be formed.

The drawing is usually carried out at a temperature not lower than the softening point of the polyolefin resin and not higher than the melting point of the resin. It is preferable to carry out heat setting after the drawing. The heat setting is preferably conducted at a temperature lower than the melting point of the polyolefin resin.

In the method for producing a laminated porous polyolefin film of the present invention, drawing is conducted after the lamination of polyolefin films. According to this method, even if each polyolefin film before lamination contains foreign substances or fish eyes, cracks, which are formed from them through drawing, will grow only across the thickness of each film laminated. A laminated porous polyolefin film obtained by use of the method of the present invention does not contain a pinhole penetrating the laminated porous film.

A laminated porous polyolefin film obtained by use of the present invention preferably has a film thickness of 1 to 100 μm, a Gurley value of 10 to 600 sec/100 cc, and a needle penetration strength of 200 gf or more. Such a laminated porous polyolefin resin is employed suitably as a cell separator.

A laminated porous polyolefin film free of fillers can be formed by treating a laminated porous polyolefin film obtained by use of the method of the present invention with acid or alkali to extract the filler contained in the laminated porous polyolefin film. The porous film from which fillers have been removed can be employed suitably as a cell separator superior in shut-down property.

Laminated porous polyolefin films obtained by use of the present invention are superior in mechanical strength, air permeability and interlayer adhesion strength. They therefore are used for applications such as clothes, filters and are also used as cell separators.

According to the present invention, laminated porous polyolefin films which are superior in mechanical strength, air permeability and interlayer adhesiveness and which are free of pinholes can be obtained.

EXAMPLES

Hereinafter, the present invention is descried in more detail by reference to the Examples, which are not intended to limit the present invention.

[Measurement of MI]

The measurement was carried out according to JIS K 7210. The measurement apparatus used was a melt indexer manufactured by Takara Kogyo K.K. equipped with an orifice having a diameter D=2.095 mm and a length L=8.00 mm. The measurement was conducted at a temperature of 200° C. under a load of 2.16 kg.

[Measurements of Molecular Chain Length and Molecular Weight by GPC]

As a measurement apparatus, Gel Chromatograph Alliance GPC2000 manufactured by Waters Co. was employed. The measurement conditions were as follows.
Column: TSKgel GMH$_{HR}$-H(S)HT 30 cm×2 and TSKgel GMH$_6$-HTL 30 cm×2 manufactured by Tosoh Corporation,
Mobile phase: o-dichlorobenzene,
Detector: differential refractometer,
Flow rate: 1.0 mL/minute,
Column temperature: 140° C., and
Injection amount: 500 μL.

After 30 mg of a sample was completely dissolved in 20 mL of o-dichlorobenzene at 145° C., the solution was filtered through a sintered filter having a pore diameter of 0.45 μm and the obtained filtrate was used for the measurement.

It is noted that calibration curves were produced using 16 types of standardized polystyrene and the Q factor of polystyrene was 41.3.

[Gurley Value]

The Gurley value(sec/100 cc) of a porous film was measured by a B-type densitometer (Toyo Seiki Seisaku-Sho, Co., Ltd.) according to JIS P 8117.

[Needle Penetration Strength]

For determination of needle penetration strength, a metal needle having a diameter of 1 mm and a needle tip curvature radius of 0.5 mm was penetrated at a rate of 200 mm/min into a film fixed with a washer having a diameter of 12 mm, and the maximum load by which a hole had been formed in the film was used as the needle penetration strength.

[Presence of Pinholes]

The presence of pinholes in a porous film was checked visually and by bubble point measurement (ASTM F316).

[Interlayer Adhesiveness]

A laminated porous film was cut into a strip sized 15 mm (in width direction of film)×70 mm (in direction of film extrusion) to form a test sample.

On each side of the test sample, a pressure sensitive tape sized 17 mm×90 mm was stuck so that it covered the surface of the test sample. Then, one end of each pressure sensitive tape was pulled at a pulling speed of 300 mm/min simultaneously to opposite directions with an angle of 180° by means of a tensile tester Autograph AGS-500 manufactured by Shimadzu Corp.

When the peeled surfaces of the test sample were suffered from interfacial failure, the sample is judged to be of weak interlayer adhesiveness or of poor adhesiveness. On the other hand, when the surfaces were suffered from cohesive failure, the sample is judged to be of strong interlayer adhesiveness or of good adhesiveness.

Example 1

A polyethylene mixture (MI=not higher than 0.01 g/10 min) obtained by mixing [1] 70% by weight of polyethylene powder (Highzex Million 340M, manufactured by Mitsui Chemicals, Inc., MI=not higher than 0.01 g/10 min, weight average molecular chain length=17,000 nm, weight average molecular weight=3,000,000, melting point=136° C.) and [2] 30% by weight of polyethylene powder (High Wax 110P, manufactured by Mitsui Chemicals, Inc., weight average molecular weight=1,000, melting point=110° C.) was kneaded in a twin screw extruder. At a middle point of the extruder, calcium carbonate (Pigot 10, manufactured by Shiraishi Calcium Kaisha, Ltd., average particle diameter=0.1 μm) in an amount of 120 parts by weight for 100 parts by weight of the polyethylene mixture was added and melt-kneaded at 230° C. Thus, a polyolefin resin composition (B-1) was obtained. The polyolefin resin composition (B-1) contained 27% by weight of polyethylene having a molecular chain length of 2850 nm or longer. In addition, the polyolefin resin composition (B-1) had an MI of 0.01 g/10 min.

The polyolefin resin composition (B-1) was rolled by means of a pair of rolls having a surface temperature of 150° C. which rotated at the same circumferential speed. Thus, a single layer polyolefin film (A-1) having a thickness of about 40 p-m was prepared. Using the relating single layer polyolefin film (A-1), a laminated polyolefin film (D-1) was produced by a method illustrated in FIG. 1. Concretely, the polyolefin resin composition (B-1) was rolled between rolls (1) and (2) having a surface temperature of 150° C. to yield a polyolefin film (C-1). The polyolefin film (C-1) and the polyolefin film (A-1) were thermocompression bonded to yield the laminated polyolefin film (D-1) made up of the polyolefin film (A-1) and the polyolefin film (C-1) laminated together. The laminated polyolefin film (D-1) was drawn 5.5-fold at 110° C. by a tenter and then heat-set at 120° C. to yield a laminated porous polyolefin film.

The calcium carbonate was removed from the laminated porous polyolefin film by washing of the film with an surfactant-containing acidic aqueous solution. The resulting film was passed through hot rolls at 70° C. to be dried. Thus, a laminated porous polyolefin film free of fillers was obtained.

Example 2

A polyethylene mixture (MI=not higher than 0.01 g/10 min) obtained by mixing [1] 60% by weight of polyethylene powder, [2] 28% by weight of polyethylene powder, both the same as those used in Example 1, [3] 12% by weight of a linear polyethylene (FV201, manufactured by Sumitomo Chemical, Co., Ltd., melting point=121° C.) was kneaded in a twin screw extruder. At a middle point of the extruder, calcium carbonate (Pigot 10, manufactured by Shiraishi Calcium Kaisha, Ltd., average particle diameter=0.1 μm) in an amount of 120 parts by weight for 100 parts by weight of the polyethylene mixture was added and melt-kneaded at 230° C. Thus, a polyolefin resin composition (B-2) was obtained. The polyolefin resin composition (B-2) had an MI of 0.02 g/10 min. Using the polyolefin resin composition (B-2) and setting the roll surface temperature at 150° C. like Example 1, a single layer polyolefin film (A-2) having a thickness of about 40 μm was prepared. Then, in the same manner as Example 1 except using the polyolefin film (A-2) instead of the polyolefin film (A-1), a laminated polyolefin film (D-2) made up of the polyolefin film (C-1) and the polyolefin film (A-2) laminated together was obtained. The laminated polyolefin film (D-2) was drawn 5.5-fold at 110° C. by a tenter and then heat-set at 120° C. to yield a laminated porous polyolefin film.

Example 3

A polyolefin resin composition (B-3) was prepared in the same way as that used in the preparation of the polyolefin resin composition (B-1) in Example 1 except using calcium carbonate having an average particle diameter of 0.15 μm (Star Pigot 15A, manufactured by Shiraishi Calcium, Ltd. instead the calcium carbonate used in Example 1. The polyolefin resin composition (B-3) had an MI of 0.01 g/10 min. Using the polyolefin resin composition (B-3) and setting the roll surface temperature at 150° C. like Example 1, a single layer polyolefin film (A-3) having a thickness of about 40 μm was prepared. Then, in the same manner as Example 1 except using the polyolefin film (A-3) instead of the polyolefin film (A-1), a laminated polyolefin film (D-3) made up of the polyolefin film (C-1) and the polyolefin film (A-3) laminated together was obtained. The laminated polyolefin film (D-3) was drawn 5.5-fold at 110° C. by a tenter and then heat-set at 120C to yield a laminated porous polyolefin film.

Comparative Example 1

A laminated polyolefin film (D-4) was obtained by laminating two single polyolefin films (A-1) produced in Example 1 by paired rolls having a surface temperature of 110° C. by a method illustrated in FIG. 2. Then, the laminated polyolefin film (D-4) was drawn 5.5-fold at 110° C. by a tenter and then heat-set at 120° C. to yield a laminated porous polyolefin film.

Comparative Example 2

The air permeability, thickness and needle penetration strength of a commercial porous polyolefin film were measured. The results are shown in Table 1.

The porous polyolefin film was produced by forming a resin composition composed of 40% by weight of polyethylene (MI=2 g/10 min) and 60% by weight of calcium carbonate (average particle diameter=1.25 μm) into a film by means of a T-die molding machine and then drawing the film by a drawing machine. The content of polyethylene having a molecular chain length of 2850 nm or longer, as measured by GPC, was less than 1%.

The evaluations of pinholes and interlayer adhesiveness of the laminated porous polyolefin films of Examples 1 to 3 and Comparative Example 1 are shown in Table 1.

TABLE 1

| | Presence of pinholes | Interlayer adhesiveness |
|---|---|---|
| Example 1 | No pinholes | Good |
| Example 2 | No pinholes | Good |
| Example 3 | No pinholes | Good |
| Comparative Example 1 | No pinholes | Poor |

The results in Table 1 show that the laminated porous polyolefin films of Examples 1 to 3 were superior in interlayer adhesiveness-and free of pinholes.

The measurements of needle penetration strength, Gurley value and thickness of the laminated porous polyolefin films obtained in Examples 1 to 3, the laminated porous polyolefin film free of fillers obtained in Example 1, and the porous polyolefin film of Comparative Example 2 are shown below.

TABLE 2

| | Film thickness (μm) | Gurley value (sec/100 cc) | Needle penetration strength (gf) |
|---|---|---|---|
| Example 1 (with filler) | 27 | 120 | 514 |
| Example 1 (without filler) | 17 | 280 | 540 |
| Example 2 | 26 | 245 | 454 |
| Example 3 | 25 | 100 | 480 |
| Comparative Example 2 | 35 | 90 | 120 |

As shown in Table 2, the laminated porous polyolefin films obtained in Examples 1 to 4 were laminated porous polyolefin films having extremely higher needle penetration strengths and sufficient air permeabilities (lower Gurley values) in comparison with the commercial porous polyolefin film of Comparative Example 2.

What is claimed is:
1. A method for producing a laminated porous polyolefin film, the method comprising steps of:

providing a pair of tools for thermocompression bonding two resin films therebetween, each of the tools having a thermocompressing portion between which and the thermocompressing portion of the other tool two films are piled and compressed to bond together, laminating two films each comprising at least one layer made of a polyolefin resin composition comprising 100 parts by weight of a polyolefin resin having a melt index of 0.1 g/10 min or less and 80 to 300 parts by weight of a filler to form a laminated film by piling and thermocompression bonding the films between the thermocompressing portions of the tools, wherein the surface temperature of each thermocompressing portion is adjusted to a temperature higher than the melting point of the polyolefin resin by from 5 to 25° C. during the lamination, and drawing the laminated film to form micropores therein, thereby yielding a porous film, wherein the polyolefin resin is composed of two or more components and the melting point of the polyolefin resin is defined to be the highest peak temperature determined by DSC (Differential Scanning Calorimetry).

2. The method for producing a laminated porous polyolefin film according to claim 1, wherein the polyolefin resin is a polyolefin resin containing 10% by weight or more of polyolefin having a molecular chain length of 2850 nm or more.

* * * * *